UNITED STATES PATENT OFFICE.

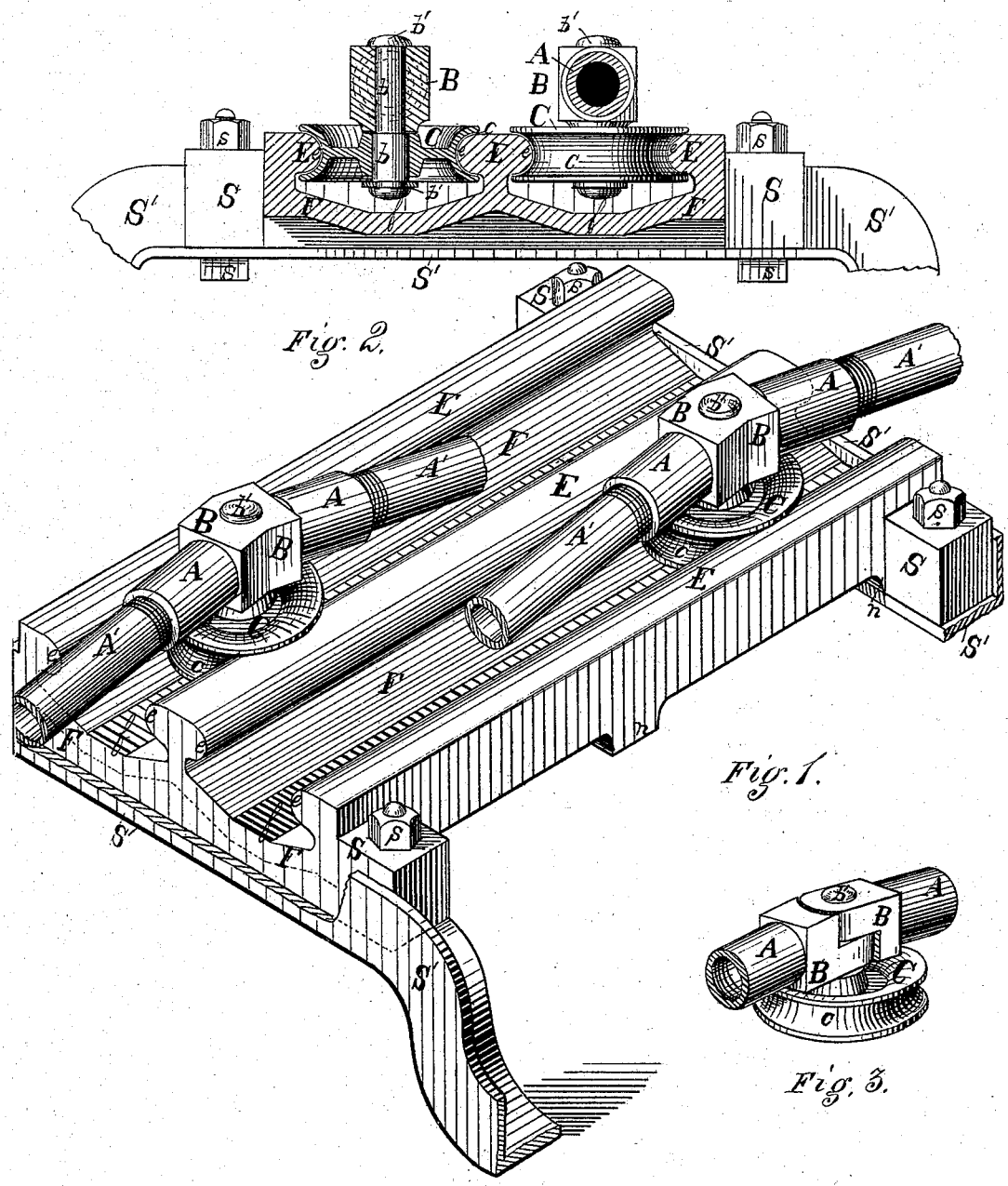

CALEB H. JACKSON AND FREDERICK S. GUERBER, OF HARRISBURG, PENNSYLVANIA, ASSIGNORS TO THE TOUCEY AND BUCHANAN INTERLOCKING SWITCH COMPANY, OF SAME PLACE.

DEFLECTION-STAND.

SPECIFICATION forming part of Letters Patent No. 224,540, dated February 17, 1880.

Application filed December 26, 1879.

*To all whom it may concern:*

Be it known that we, CALEB H. JACKSON and FREDERICK S. GUERBER, both of Harrisburg, county of Dauphin, State of Pennsylvania, have invented or discovered a new and useful Improvement in Deflection-Stands; and we do hereby declare the following to be a full, clear, concise, and exact description thereof, reference being had to the accompanying drawings, making a part of this specification, in which—like letters indicating like parts—

Figure 1 is a perspective view of our improved deflection-stand. Fig. 2 shows a transverse section of the same; and Fig. 3 is a detached view illustrative of a modification in the construction of the coupling, as hereinafter described.

Our invention relates to an apparatus for supporting and guiding the connecting-rods by which switches and signals are connected with their operating-levers.

It is frequently desirable to operate such switches and signals from distant stations, and along curved as well as straight tracks; and our improved apparatus is particularly designed for use under such conditions, although it may frequently be used to advantage under other conditions and for other purposes.

It is constructed as follows: A' A' represent sections or ends of ordinary gas-pipe, such as is commonly employed for connecting distant switches and signals with their operating-levers. These pipe ends are screwed into sockets A, which are rigidly secured in any convenient way to the opposite sides of an intermediate block, B, which may be made solid, as in Fig. 1, or in two jointed parts, as in Fig. 3, this joint being such as to allow separate or independent motion of the two parts on their pivotal center in a horizontal plane. A coupling is thus formed for connecting the several lengths of pipe. This pipe is usually laid along the lines of track, and when such track is curved the sockets A, in case the solid block B, Fig. 1, is used, are fastened to such block in any convenient way at an angle with each other corresponding approximately to the curve of the track; but if the jointed coupling, Fig. 3, be used the line of pipe will readily adapt itself to the curve desired. These couplings and the connected pipe are carried by wheels C, one of which is journaled to the under side of each of the coupling-blocks B by means of bolts $b$ passing centrally through wheel and block, and secured by nuts or upset heads and suitable washers $b'$. Both wheel and coupling are thus free to turn on their common bolt $b$, so that the wheel may rotate, while the coupling may be set in any desired position in a horizontal direction.

Circumferential grooves $c$ are made in the peripheries of the wheels, which are adapted to take and follow or run upon the flanges $e$ of guide-rails E.

The form of grooves $c$, as well as of flanges $e$, may be varied at pleasure. We prefer a rounded form, as shown, and the grooves should be made deep enough to overlap somewhat the upper and lower faces of the flanges, and thereby furnish bearings for carrying the weight of rods and couplings, as well as to prevent the wheels from leaving the guides when in use.

The guides E are made, by preference, of T form, and they are arranged parallel and in a common plane upon a bed-plate, F, with which they may be cast solid, or to which they may be secured in any convenient way. Any desired number of such guide-rails may be employed, depending upon the number of rods to be supported. The outside rails may be made with a single guide-flange, as shown.

In order to provide room for the free rotation of wheels C, and still render the device as compact as possible, we sink or make longitudinal depressions $f$ in the base-plate, under the wheels, and in the line of their path; and we also prefer to stiffen or strengthen this bed F by cross-ribs $n$ on its under side.

If desired, drain-holes or openings may be made in or through the depressions $f$, to prevent the accumulation of water on the bed-plate. This plate is supported and secured by means of bolts $s$ passing through projecting corners S of the plate and through the bottom or seat of the end chairs, S', which latter may be spiked or bolted to any suitable foundation. The manner of supporting and securing the plate may, however, be varied, as required by the conditions of use; and instead of a continuous bed-plate, F, as shown, transverse stringers may be used, and the guide-rails may be spiked or bolted to such stringers; but we prefer to use the solid plate, as shown, as the proper relationship of the parts is better preserved thereby, and the free working of the device is made more certain, which is a matter of great importance in the operation of switches and signals.

The manner of operating this device will be apparent to those acquainted with the art. In such operation the thrust or pulling force (as the case may be) will press the carrying-wheel against one of the guide-rails, and thus cause it to rotate, and thereby reduce friction and render the operation of the connecting rods or pipe easy.

One great advantage which we secure by our improvement is the bringing of the connecting-rods and couplings entirely above the plane of the guiding and carrying devices, so that no part of such devices can interfere with the operation of the rods, whatever may be their angle of inclination or length of throw; but when the connecting-rods are inclosed within a frame-work, as has heretofore been done, such angle of inclination must be limited by the surrounding frame-work, which is often a matter of great inconvenience.

We also have secured by our improvement a cheap and reliable apparatus, which is not liable to get out of order or become inoperative.

We claim herein as our invention—

1. In a deflection-stand, the combination of T-shaped or flanged guide-rails E, arranged with their flanged heads in a common plane, carrying-wheels C, one or more in number, having grooved peripheries adapted to take and follow the flanges of the guides, and a coupling device journaled or pivoted on the carrying-wheel above the plane of the wheel and guides, substantially as set forth.

2. The combination of a common bed-plate, F, guides E, arranged in a common plane upon such plate, wheel C, having a grooved periphery adapted to take and follow the guides, and coupling A B, carried on and by the wheel above the plane of the wheel and guides, substantially as set forth.

In testimony whereof we have hereunto set our hands.

CALEB H. JACKSON.
FREDERICK S. GUERBER.

Witnesses:
J. B. EWING,
EUGENE SNYDER.